United States Patent [19]
Baxter et al.

[11] Patent Number: 5,727,443
[45] Date of Patent: Mar. 17, 1998

[54] METHOD OF BALANCING A HYDRAULIC VALVE FOR A POWER STEERING GEAR

[75] Inventors: John Baxter, Chatswood; Geoff Dyer, Casula, both of Australia; Donald G. Murdock, Indianapolis, Ind.

[73] Assignee: A.E. Bishop & Associates Pty Limited, North Ryde, Australia

[21] Appl. No.: 511,024

[22] Filed: Aug. 3, 1995

Related U.S. Application Data

[63] Continuation-in-part of Ser. No. 348,215, Nov. 28, 1994, abandoned.

[51] Int. Cl.⁶ ............................................. F15B 9/10
[52] U.S. Cl. ........................ 91/375 A; 137/625.22; 29/890.124; 29/890.131
[58] Field of Search ........................ 91/370, 371, 374, 91/375 R, 375 A, 382; 180/132, 148, 141; 137/625.22, 625.23, 625.24; 29/890.12, 890.124, 890.131

[56] References Cited

U.S. PATENT DOCUMENTS

| | | | |
|---|---|---|---|
| 3,022,722 | 2/1962 | Zeigler et al. | |
| 4,103,407 | 8/1978 | Elezalde et al. | 29/890.12 |
| 4,788,877 | 12/1988 | Robinson et al. | 91/375 A X |
| 4,819,545 | 4/1989 | Dymond | 91/375 A X |
| 4,823,839 | 4/1989 | Rayner | 91/375 A X |
| 5,115,879 | 5/1992 | Imura et al. | 91/375 A X |
| 5,178,189 | 1/1993 | Mitoya | 91/375 A X |
| 5,230,273 | 7/1993 | Fraley, Jr. | 91/375 A X |

*Primary Examiner*—Hoang Nguyen
*Attorney, Agent, or Firm*—Nikaido, Marmelstein, Murray & Oram LLP

[57] ABSTRACT

Hydraulic valves subjected to a pressure medium in power steering gear include a sleeve journalled on an input shaft, with the sleeve having a torsion bar connected thereto via a driven member. A method of balancing the hydraulic valve includes the steps of inserting the valve into a balanced housing, then determining the neutral position of the input shaft relative to the sleeve. The neutral position is then fixed by rotational connection of the input shaft and torsion bar. The pressure medium used to determine the neutral position is a gaseous medium, and a temporary sealing device adapted to seal the gaseous medium is in contact with the outside surface of the sleeve during determination of the neutral position.

40 Claims, 15 Drawing Sheets

METHOD OF BALANCING A HYDRAULIC VALVE FOR A POWER STEERING GEAR

CROSS REFERENCE TO RELATED APPLICATION

This application is a continuation-in-part of U.S. Ser. No. 08/348,215, filed Nov. 28, 1994, abandoned.

TECHNICAL FIELD

The present invention relates to power steering gears for motor vehicles, and in particular to the method of balancing hydraulic valves used in such gears. Whilst the invention is described in reference to rotary valves, it is anticipated that the invention is equally applicable to other less common styles of valves, for example piston valves.

BACKGROUND

Known rotary valves typically employ an input-shaft which extends ends upwardly from the steering gear assembly and is connected by a flexible coupling to the steering wheel shaft. For this purpose, the extended end of the input-shaft is externally splined.

The steering gear assembly is provided with a valve housing containing an input-shaft and a sleeve member supported thereon. For the purposes of reducing valve operating friction some manufacturers support the sleeve member on the input-shaft via needle roller bearings, these needle roller bearings serving to maintain a small radial clearance between the outside diameter of the input-shaft and inside a diameter of the sleeve. However the vast majority of manufacturers journal the sleeve member directly on the outside diameter of the input-shaft. For the purposes of this specification both these types of support will be referred to as "journalling". The input-shaft extends through the sleeve and is journalled with respect to the steering gear driven member which, for a rack and pinion steering gear, is the pinion. For an "integral" steering gear box, the driven member is normally the worm portion of a recirculating ball nut assembly.

The sleeve is usually arranged to be driven in a slack-free manner by a drive pin extending radially from the pinion although, in other less common hydraulic valves, this slack-free drive is facilitated by the sleeve and pinion being manufactured as an integral arrangement. The downwardly-extending end of the input-shaft is splined in a loose-fitting manner to the pinion so allowing limited relative rotation between the input-shaft and the pinion, and hence also between the input-shaft and the sleeve.

Both the input-shaft and the sleeve member have respectively outwardly and inwardly facing longitudinal chambers formed on their interfacing surfaces which constitute an open centre four way valve operable on relative angular rotation of these components.

The sleeve operates within the valve housing and is provided with several circumferential grooves and seals which allow oil under pressure to be directed to and from an external hydraulic pump and to and from left and right assist cylinders in the manner well known in the art. The input-shaft and the sleeve are normally biased towards a neutral position by a torsion bar secured at its lower end to the pinion. The aforementioned slack-free drive of the sleeve therefore effectively means that the sleeve and torsion bar are rotationally connected via the pinion, the driven member in this case. The torsion bar is secured to the input-shaft at the upper end of the torsion bar, from the pinion, henceforth referred to as the "fixing end" of the torsion bar.

The general method of operation of such rotary valves is well known in the art of power steering design and so will not be described in any greater detail in this specification. A description of this operation is contained in U.S. Pat. No. 3,022,772 (Zeigler), commonly held as being the "original" patent disclosing the rotary valve concept.

It is a requirement of operation of most steering gears that the left and right turn hydraulic assist characteristics be as nearly as possible identical, and this symmetry of operation can only be established at the time of assembly of the valve due to the finite tolerances assigned to the various components involved. Great accuracy is required in determining the neutral position of the valve components to ensure this symmetry. Moreover, once this position is determined, it must be retained for the life of the steering gear.

For most power steering gears the theoretically ideal neutral position of the input-shaft and sleeve components can be defined as the position about which an equal angular rotation or an equal input torque applied to the input-shaft in either direction, with respect to the sleeve, will result in equal magnitudes of differential pressure of hydraulic fluid being supplied to the left and right assist cylinders during valve operation. The operation of determining and fixing the neutral position is referred to as a "balancing" operation and typically involves adjustment of the angular disposition of the input-shaft with respect to the torsion bar whilst angular rotation of the input-shaft with respect to the sleeve, or alternatively the input torque applied to the input-shaft (which is temporarily locked to the torsion bar), is measured against the valve inlet pressure.

However, for a certain limited class of power steering gears, known as centre-take-off steering gears, the neutral position aimed for during balancing is not necessarily the position described above. These steering gears usually employ an end-located hydraulic cylinder, resulting in a differential operating area between right-hand and left-hand assist cylinders. For these centre take-off steering gears, the neutral position of the input-shaft and sleeve components is often shifted a small predetermined angle either clockwise or anti-clockwise to partially compensate for the imbalance which would otherwise occur due to this differential operating area.

According to the most common present practice, the fixing end of the torsion bar is secured to the input-shaft by a pin pressed through a diametrically disposed hole drilled and reamed through both components during the assembly operation which is performed in a "balancing" machine.

Such balancing machines take many different formats however, typically, the driven member (i.e. the pinion or worm) and the end of the torsion bar protruding through the upper end of the input-shaft are both rotationally clamped such that the torsion bar is in its undeflected state. The input-shaft is clamped to a vernier drive mechanism capable of imparting very fine angular displacements to the input-shaft relative to the driven member, and hence the sleeve. After establishing oil supply to the valve at required flow rate and temperature, the input-shaft is rotationally displaced in one direction until inlet pressure corresponds to a predetermined check point pressure and the corresponding magnitude of this displacement recorded. The input-shaft is then rotated in the opposite direction until the measured pressure again equals the predetermined check point pressure and a displacement magnitude is similarly recorded. The mean (half way point) of these two angular displacements is then calculated and the input-shaft rotated to this position and clamped. The aforementioned hole is then drilled and reamed and the pin pressed in. The force required to insert the pin is frequently monitored as a measure of the interference fit existing between the reamed hole and pin; also a "push-out" test is often performed to check for pin retention up to a predetermined force on the pin.

In other less common balancing machines differential pressure between the left and right cylinder ports of the valve, rather than inlet pressure, is used as the criterion for matching check point pressure. The net effect is virtually identical since, for most power steering valves, differential pressure above a threshold of say 1 MPa, corresponds very closely to inlet pressure.

In any case there are a number of disadvantages associated with the methodology used by such machines. Firstly, the drilling and reaming operations are time consuming, due to the need to provide a hole of high accuracy and good surface finish for the subsequent interference fitting of the pin. Secondly, the alignment of the pin to the hole is critical for correct fitting. It frequently happens during balancing that, having determined the correct neutral position, the precise angular disposition of the input-shaft and torsion bar is disturbed due to cutting forces applied by the drilling or reaming operation or, indeed, the very large forces necessary for pin insertion. It is therefore found that, on inspection of the completed steering gear or valve, hydraulic operation is no longer symmetrical, requiring the valve assembly be extensively reworked or, alternatively, scrapped. Furthermore, it is an undesirable feature of the existing method that, on such precise balancing machines involving electronic sensing devices for both pressure and angular rotation (or in some cases also input torque), metal cutting operations are carried out in close proximity to such instrumentation.

A third disadvantage of the current hydraulic balancing methods is the inherent contamination of the valve components by the hydraulic fluid during balancing. This precludes any potentially more accurate and lower cost connection method of the input-shaft to the torsion bar which requires these components to be relatively clean and dry.

Another method of balancing a hydraulic valve for a power steering gear, utilizing air as the balancing medium, is taught in Japanese Patent Publication No (A) 56-108355 in the name of Toyota Motor Corporation. This method of air balancing is limited to "spool" type hydraulic valves in which the valve components have been pre-assembled into the valve housing of the power steering gear. This method of air balancing cannot be performed on valves other than the "spool" type, such as rotary and piston type valves which necessarily incorporate circumferential seals on the outside of the sleeve for sealing hydraulic fluid. When a rotary or piston type valve is assembled into the valve housing of a power steering gear, air cannot be used as the balancing medium, as the arrangement of circumferential seals does not provide a sufficiently airtight seal.

A further drawback with the method of air balancing, as taught in Japanese Patent Publication No (A) 56-108355, is that the drilling and pinning operations for connecting the input-shaft to the torsion bar have the same drawbacks as that of the known hydraulic balancing i.e. that drilling, reaming and pinning is time consuming and can result in disturbing the angular disposition of the torsion bar and input-shaft.

A further method of balancing is taught in International Patent Application No. PCT/AU92/00580 in the name of James N Kirby Products Pty Limited. This method of balancing is achieved mechanically rather than hydraulically. Whilst this method allows the valve components to be free from oil contamination, which potentially allows for the use of adhesive to fix the torsion bar to the input-shaft, no detailed arrangement of how these valve components would be connected is described.

DISCLOSURE OF INVENTION

In accordance with a first aspect the present invention there is disclosed a method of balancing an hydraulic valve for a power steering gear in which the valve is subjected to a pressure medium, the valve comprising a sleeve Journalled on an input-shaft, the sleeve having a torsion bar connected thereto via a driven member, the method comprising the steps of:

inserting the valve into a balance housing;

determining the neutral position of the input-shaft relative to the sleeve; and fixing the neutral position by rotational connection of the input-shaft and torsion bar, characterised in that the pressure medium used to determine the neutral position is a gaseous medium and a temporary sealing means adapted to seal the gaseous medium is in contact with the outside surface of the sleeve during determination of the neutral position.

Preferably the temporary sealing means is arranged to permit flow of the gaseous medium through at least one inlet port within the sleeve, whilst inhibiting flow through at least one cylinder port within the sleeve.

Preferably the temporary sealing means comprises first and second seal portions which contact the sleeve at a position axially on each side of an inlet groove in which the at least one inlet port is located.

Preferably the at least one cylinder port is located in a cylinder groove axially adjacent to the inlet groove. One of the seal portions contacts both sides of the cylinder groove, thereby sealing off the cylinder groove and inhibiting flow of the gaseous medium through the at least one cylinder port.

Preferably the balance housing has an annular central portion located between the first and second seal portions of the temporary sealing means and arranged to lie adjacent to the inlet groove. It is preferred that the gaseous medium is fluidly delivered to the inlet groove and hence admitted to the at least one inlet port located in the inlet groove, through a bore in the central portion.

In a first preferred embodiment of the first aspect of the present invention at least one of the seal portions is a hydraulically or pneumatically expandable bladder. Preferably the bladder is of annular form and adapted to be pressurised during balancing, thereby inwardly expanding and sealing against the sleeve.

In a second preferred embodiment of the first aspect of the present invention at least one of the seal portions is an elastically deformable seal ring. Preferably the seat ring is adapted to be urged by an urging means and seal against the sleeve. Preferably the urging means comprises of an actuator mechanism which is hydraulically, pneumatically or mechanically actuated.

In a third preferred embodiment of the first aspect of the present invention the temporary sealing means comprises at least one cylinder probe arranged to load radially inwardly against the at least one of the cylinder ports during balancing and therefore seal the at least one cylinder port. It is preferred that the temporary sealing means also Comprises et least one inlet probe arranged to load radially inwardly against the at least one inlet port during balancing, permitting flow of the gaseous medium through the at least one inlet port.

Preferably the temporary sealing means or the present invention is not a component or the hydraulic valve.

Preferably the hydraulic valve comprises circumferential seals solely for sealing of hydraulic fluid during operation of the valve. Preferably these seals are not fitted to the valve during balancing.

Preferably the neutral position is determined by measuring the pressure generated in the pressure medium for small angular rotational displacements of the input-shaft with respect to the sleeve, or alternatively by successively temporarily securing the input shaft and torsion bar and measuring the pressure generated in the pressure medium for input torques applied to the input shaft with respect to the pressure member.

Preferably the gaseous medium being supplied as the pressure medium during the balancing method of the present invention is regulated to a predetermined fixed pressure, then passed through a fixed reference orifice before entering the inlet of the balance housing. Relative angular displacement of the input-shaft and sleeve will vary the magnitude of the restriction generated by the valve and hence vary the gas pressure generated at the interconnection between the fixed reference orifice and the balance housing. It is preferred that the gas inlet pressure to the balance housing is measured at the inlet to the balance housing and compared to a check pressure the determining the neutral position, however, it is possible that differential pressure of the gaseous medium between the left-hand and right-hand cylinder ports of the valve is also used.

Preferably the gaseous pressure medium is air, and can be readily sourced from a conventional factory compressed air supply after filtering. Alternatively, nitrogen or some other suitable gaseous medium or combination of gases can be used.

Preferably the input-shaft and torsion bar are axially displaced with respect to each other prior to fixing the input-shaft to the torsion bar.

Preferably the input-shaft is connected to the torsion bar by means of a bonding process such as adhesive bonding, soldering, brazing, welding (e.g. "electron beam" welding) or some other bonding agent, or mechanically keyed by means of a plastic or epoxy glue.

Preferably the bonding agent is injected and heated. The heating may take place after the bonding agent is injected to accelerate curing thereof. Alternatively, heating may take place during injection of the bonding or keying agent to assist in its application.

The valve can be released from the balance housing when the bonding or mechanical keying agent between the input shaft and the torsion bar has sufficient strength that the forces exerted during such releasing do not perturb the fixing of the neutral position.

After the bonding between the input shaft and the torsion bar has reached adequate strength, it is preferable that a substantially diametrally disposed hole is machined through both these components at or near where they are bonded together and a pin press-fitted therein. The earlier referred to disturbance of the precise angular disposition of the input-shaft and torsion bar will now not occur since the cutting forces imposed by the hole machining operation (e.g. drilling or drilling/reaming), or indeed the loads exerted by the pressing in of the pin, is resisted by the bonding medium. In these circumstances the pin constitutes a secondary safety device and will only be functional in the rare circumstances that the bonding medium is improperly applied during balancing and therefore subsequently fails during service. Since the pin is a secondary safety device and the precise angular disposition of the input-shaft and torsion bar is actually maintained by the bonding medium, it is no longer essential to ensure such a large degree of interference in the press-fitting of the pin. Consequently lower cost and more compliant pin devices can preferably be employed such as a roll-pin, for example a "Sel-Lok" pin as marketed by Unbrako.

Preferably a radial clearance exists between the input-shaft and the torsion bar and the injected bonding agent or mechanical keying agent substantially fills the resulting annular cavity such as to provide a seal preventing hydraulic fluid from leaking from the valve in use.

In accordance with a second aspect the present invention there is disclosed a hydraulic valve for a power steering gear, the valve comprising a sleeve journalled on an input-shaft the sleeve having a torsion bar connected thereto via a driven member, the input-shaft having a bore, the torsion bar having a fixing end remote from the driven member and located within the bore of the input-shaft forming an interface therebetween, the bore of the input-shaft bonded to the fixing end of the torsion bar by a bonding agent at a position corresponding to the neutral position of the input-shaft relative to the sleeve, characterised in that the interface between the bore of the input-shaft and the fixing end of the torsion bar has at least one bond region and at least one support region, the bonding agent resides in the bond region, and the diametral clearance between the bore of the input-shaft and the fixing end of the torsion bar is substantially larger in the bond region than in the support region, so that an annular cavity is provided for the bonding agent.

Preferably the annular cavity is of substantially constant radial depth.

Preferably in a first embodiment, the diameter of the fixing end of the torsion bar is smaller in the bond region than in the support region. In this embodiment the diameter of the fixing end of the torsion bar in the bond region may be stepped down relative to the diameter in the support region.

Preferably in a second embodiment, the diameter of the bore of the input-shaft is larger in the bond region than in the support region. In this embodiment the diameter of the bore of the input-shaft in the bond region may be stepped up relative to the diameter in the support region.

Preferably the annular cavity is fully filled by the bonding agent, so as to provide a seal preventing oil from leaking from the valve in use.

Preferably in a further embodiment a groove exists in the fixing end of the torsion bar in the support region adjacent the bond region, which is adapted to hold excess bonding agent.

Preferably the bonding agent is an adhesive, solder braze, or weld material. Alternatively the bonding agent may be a mechanical keying agent such as plastic or epoxy glue.

The power steering gear is preferably either of the rack and pinion type with a pinion being the driven member, or alternatively, an integral type with a worm as the driven member. The hydraulic valve is preferably a rotary valve, however other types of valves such as piston valves can also be balanced according to the present invention.

DESCRIPTION OF THE DRAWINGS

A prior art valve and the present invention will now be described with reference to the following drawings.

MODE FOR CARRYING OUT INVENTION

Figure 1:
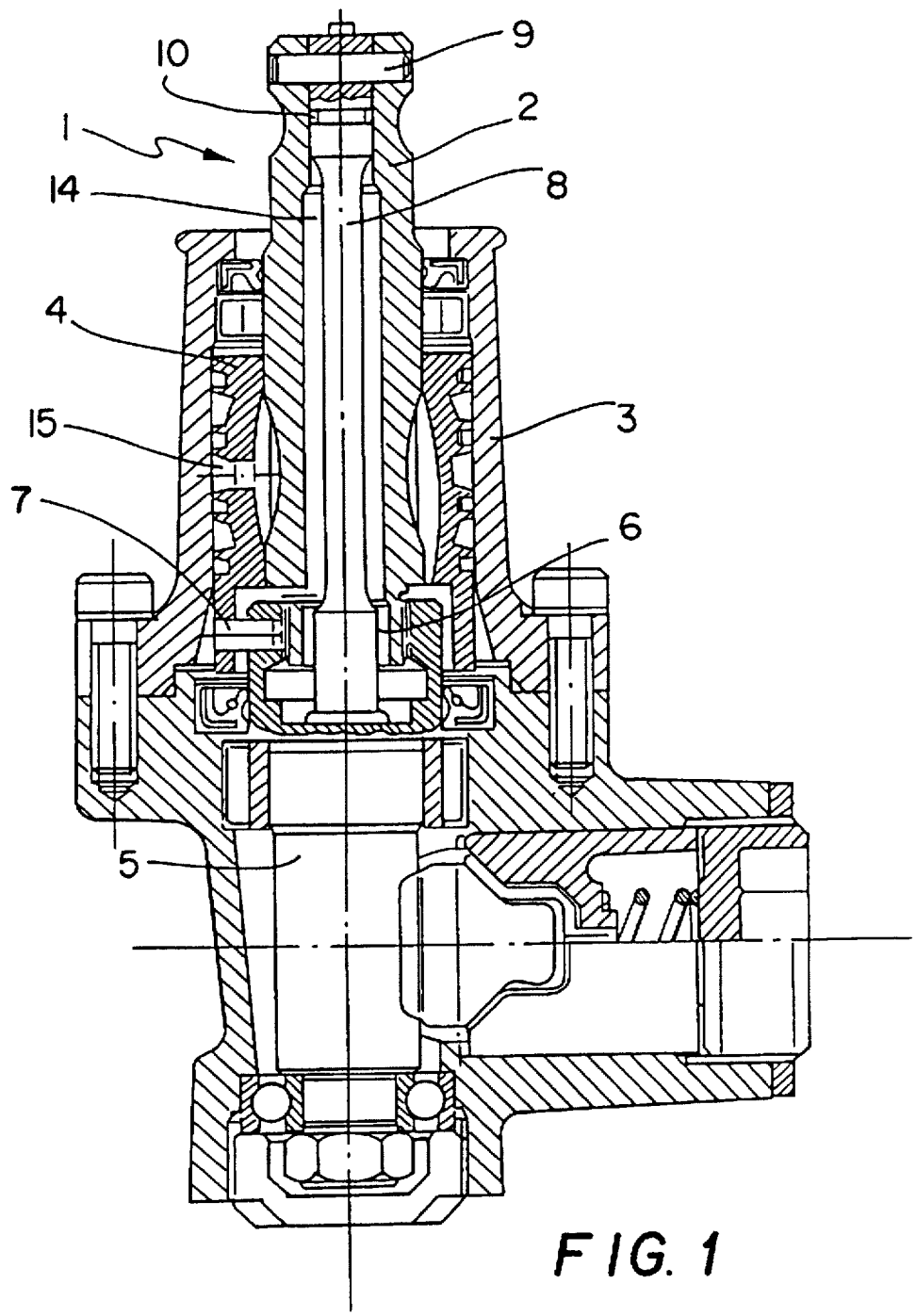
FIG. 1 is a sectional view of a prior art steering gear valve assembly.

FIG. 1 schematically depicts a typical prior art valve of the rotary type. Valve 1 is contained in housing 3 and comprises input-shaft 2 having sleeve 4 journalled thereon. The manner in which input-shaft 2 and sleeve 4 operate to direct oil to and from a hydraulic pump and assist cylinders (not shown) is well known in the art and will not further be described here. The lower end of input-shaft 2 is journalled on the lower end of torsion bar 8 via bush 6, the former axially protruding from pinion 5. Sleeve drive pin 7, radially protruding from pinion 5, engages a hole in sleeve 4 to provide a slack-free connection between sleeve 4 and pinion 5. Torsion bar 8 is firmly connected to pinion 5 by some convenient manner such as swaging.

Torsion bar 8 and input-shaft 2 are connected by an interference fitted pin 9. An O-ring is fitted in groove 10 on torsion bar 8 to seal hydraulic oil within the valve 1 such that it does not leak out between input-shaft 2 and torsion bar 8 at their cylindrical interface.

Figure 12:
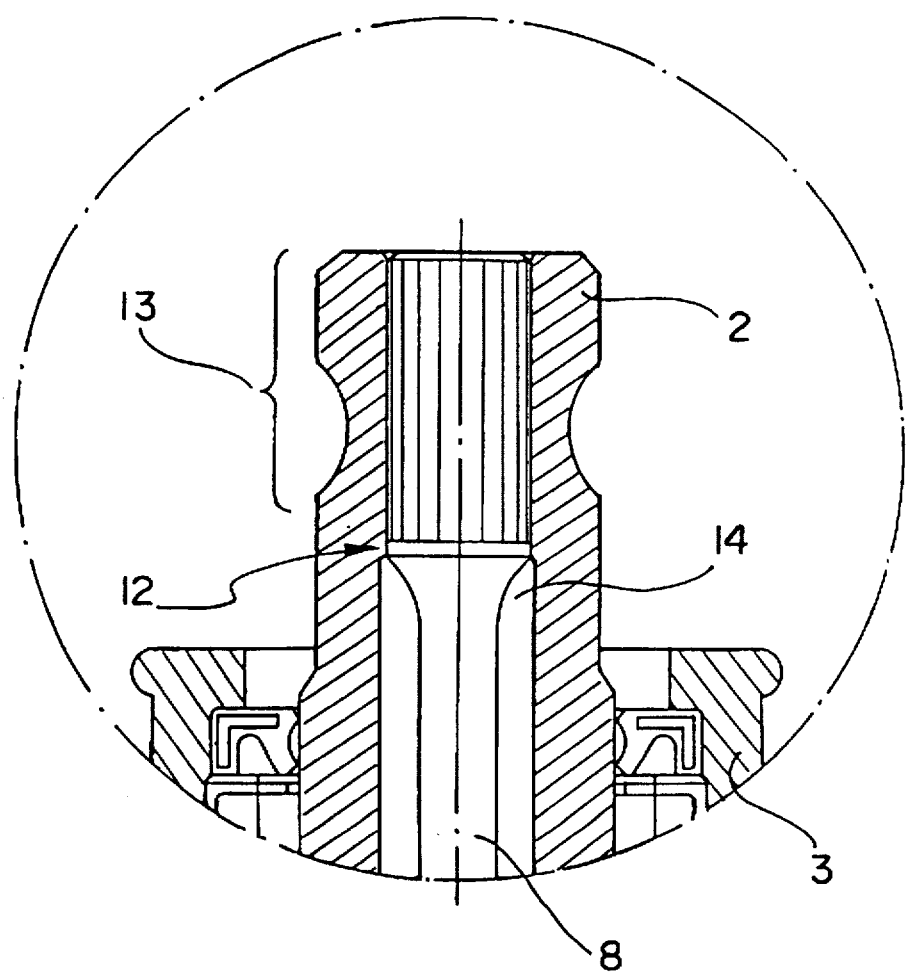
FIG. 12 is a partial sectional view of a found preferred embodiment of the input-shaft and torsion bar connection in a valve assembly according to the second aspect of the present invention.
Figure 16:
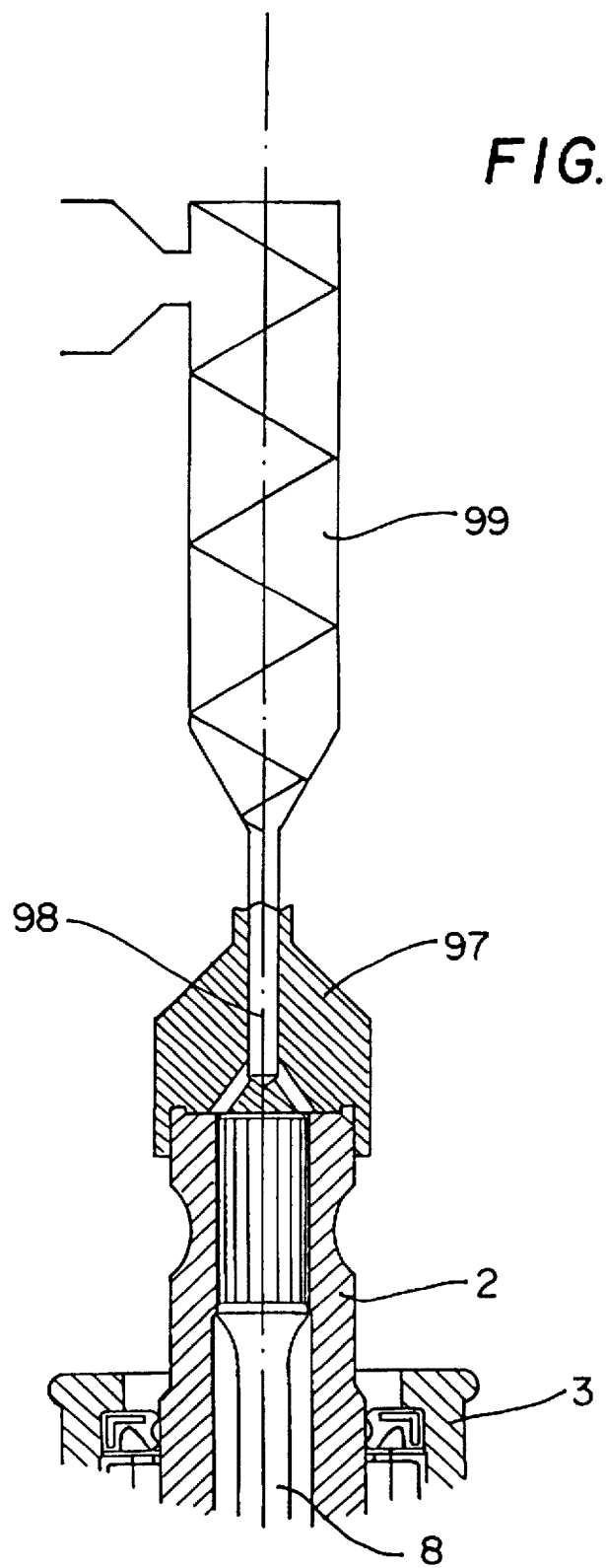
FIG. 16 is a cross-sectional elevational view of an embodiment of a plastic injection moulding nozzle used to inject plastic to form the connection of the input-shaft and torsion bar of a valve assembly as shown in FIG. 12.

Typically, prior to connection of input-shaft 2 to torsion bar 80 input-shaft 2 must be rotationally orientated with respect to the sleeve 4 such that the hydraulic neutral position of valve 1 is determined. This operation is performed in a balancing machine where hydraulic oil is supplied to the steering gear in a manner well understood in the art and described earlier in the "Background" to the Invention. FIG. 16 is a cross-sectional elevational view of an embodiment of a plastic injection moulding nozzle used to object plastic to form the connection of the input-shaft and torsion bar of a valve assembly as shown in FIG. 12.

MODE FOR CARRYING OUT INVENTION

FIG. 1 schematically depicts a typical prior art valve of the rotary type. Valve 1 is contained in housing 3 and comprises input-shaft 2 having sleeve 4 journalled thereon. The manner in which input-shaft 2 and sleeve operate to direct oil to and from a hydraulic pump and assist cylinders (not shown) is well known in the ad and will not further be described here. The lower end of input-shaft 2 is journalled on the lower end of torsion bar 8 via bush 6, the former axially protruding from pinion 5. Sleeve drive pin 7, radially protruding from pinion 5, engages a hole in sleeve 4 to provide a slack-free connection between sleeve 4 and pinion 5. Torsion bar 8 is firmly connected to pinion 5 by some convenient manner such as swaging.

Torsion bar 8 and input-shaft 2 are connected by an interference fitted pin 9. An O-ring is fitted in groove 10 on torsion bar 8 to seal hydraulic oil within the valve 1 such that it does not leak out between input-shaft 2 and torsion bar 8 at their cylindrical interface.

Typically, prior to connection of input-shaft 2 to torsion bar 8, input-shaft 2 must be rotationally orientated with respect to the sleeve 4 such that the hydraulic neutral position of valve 1 is determined. This operation is performed in a balancing machine where hydraulic oil is supplied to the steering gear in a manner well understood in the art and described earlier in the "Background" to the invention.

Once the hydraulic neutral position is determined, the drilling and reaming of a diametrically disposed hole through input-shaft 2 and torsion bar 8 takes place and pin 9 is interference fitted therein, whilst the input-shaft 2 and torsion bar 8 are respectively held.

Figure 2:
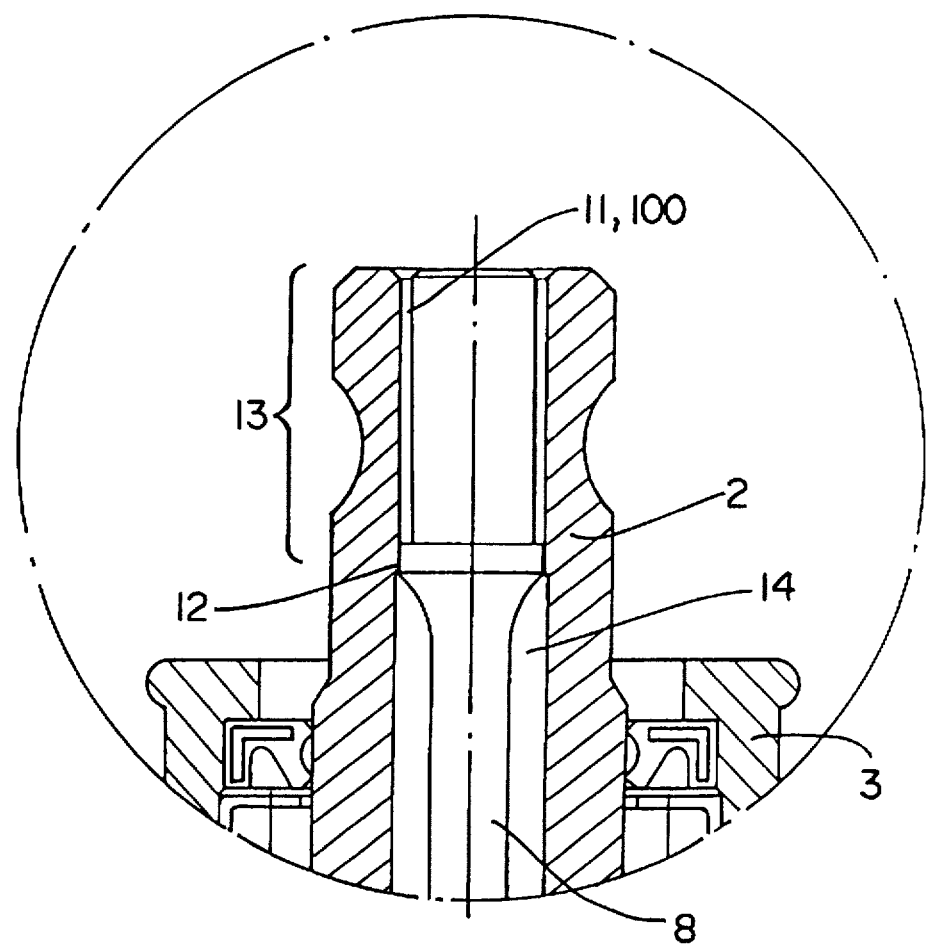
FIG. 2 is a partial sectional view of a first preferred embodiment of the input-shaft and torsion bar connection in a valve assembly according to the second aspect of the present invention.

FIG. 2 depicts a portion of a first embodiment of the second aspect of the present invention showing the region where input-shaft 2 connects with torsion bar 8. On this embodiment pin 9 of the prior ad, which interconnects input-shaft 2 to the upper fixing end of torsion bar 8, is replaced by an adhesive bond 11 between the respective pads at their cylindrical interface. One suitable bonding adhesive is that marketed under the trademark Loctite® as Engineering Adhesive 648. Note that the maximum outside diameter of the fixing end of torsion bar 8, as in support region 12, is stepped down to a reduced diameter over bonding region 13 to facilitate the injection of the adhesive during the fixing operation. Support region 12 will typically have a close clearance fit in the bore of input-shaft 2 and is aimed at preventing the propagation of adhesive into inner valve cavity 14. The purposely generated radial clearance in bonding region 13 will typically be controlled to be of the order of 0.02–0.06 mm, and forms annular cavity 100 in which adhesive bond 11 resides.

Figure 10:
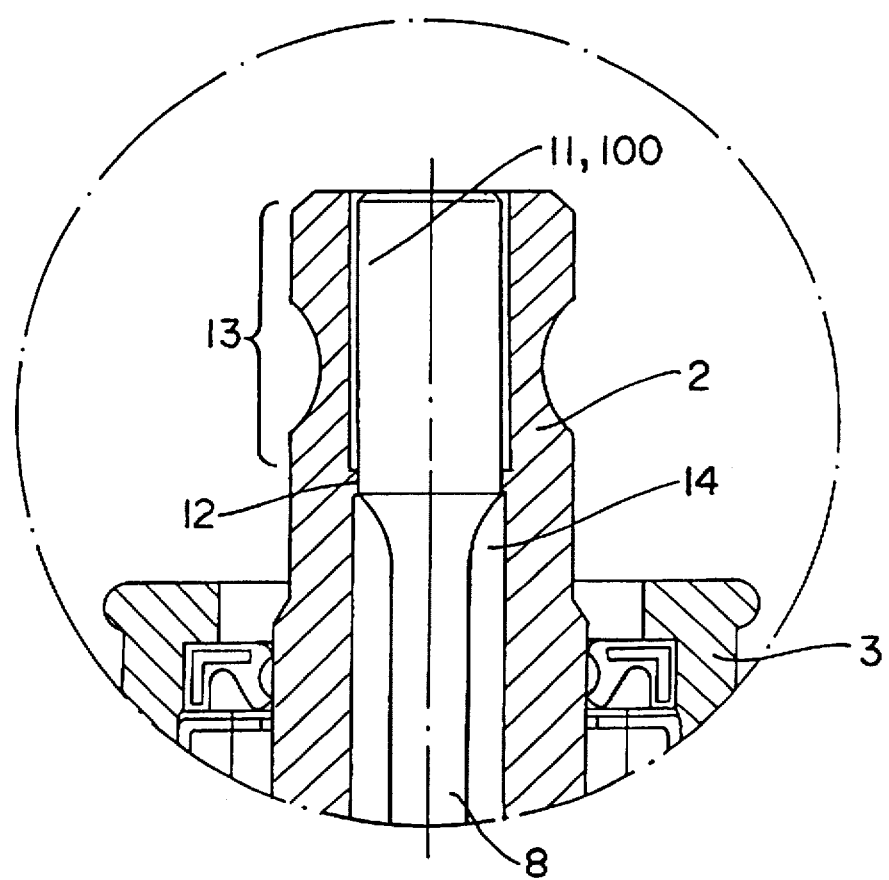
FIG. 10 is a partial sectional view of a second preferred embodiment of the input-shaft and torsion bar connection in a valve assembly according to the second aspect of the present invention.

FIG. 10 shows a second embodiment where injection of the adhesive during the fixing operation is facilitated by a step-up in the bore diameter of input-shaft 2 which again provides a controlled radial clearance over bonding region 13. Alternatively, in a not shown embodiment, torsion bar 8 may also (i.e. simultaneously) have a step down to a smaller diameter at its fixing end in a similar manner to the embodiment of FIG. 2.

When utilising such a bond, groove 10 and the relevant O-ring of the prior art valve (as shown in FIG. 1) may be eliminated. The adhesive utilised in the embodiment of the present invention also acts as a seal between input-shaft 2 and the fixing end of torsion bar 8 in that it fully encircles or fills the annular cavity 100 there between, thus preventing leakage of oil from inner valve cavity 14 at the (generally) cylindrical interface of input-shaft 2 and torsion bar 8.

Figure 11:
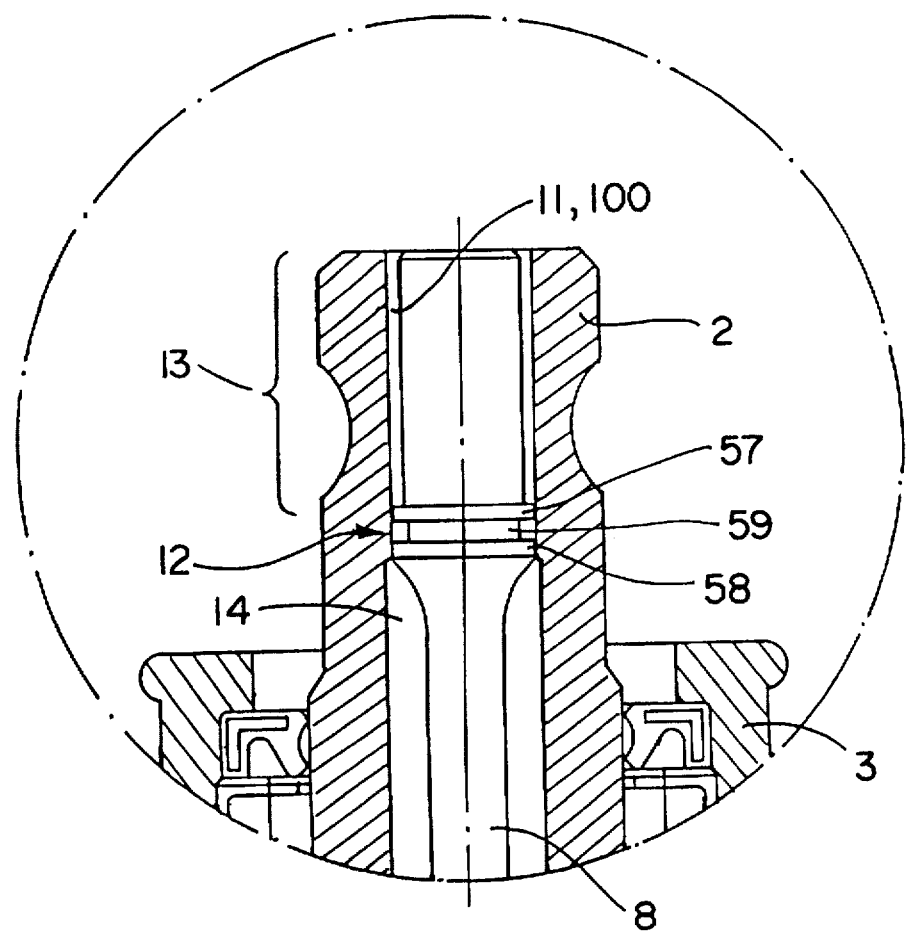
FIG. 11 is a partial sectional view of a third preferred embodiment of the input-shaft and torsion bar connection in a valve assembly according to the second aspect of the present invention.

FIG. 11 shows a third embodiment similar to that shown in FIG. 2, but also includes two closely spaced together annular projections 57 and 58 on the fixing end of torsion bar 8, such that a circumferential groove 59 exists between them in support region 12. Annular projection 57 acts as a dam, such that it is a hindrance to flow of the injected adhesive during the fixing operation. This hindrance provided by annular projection 57, ensures that injected adhesive substantially fills annular cavity 100 between input-shaft 2 and torsion bar 8 over bonding region 13. Groove 59 is provided as an overflow receptacle for excess adhesive. Whilst it is preferred that the fixing operation would entail the injection of a predetermined volume of adhesive between the input-shaft 2 and torsion bar 8, groove 59 is provided to ensure that where clearance between the input-shaft 2 and torsion bar 8 is reduced within acceptable tolerances, any excess adhesive will spill over projection 57 and be safely retained in groove 59 during injection.

FIG. 12 shows a fourth embodiment of the input-shaft/torsion bar connection, where the fixing end of the torsion bar 8 and the adjacent bore of the input-shaft are respectively externally and internally splined over bonding region 13, such that an adhesive agent or plastic can be injected between input-shaft 2 and torsion bar 8 to bond or mechanically key them together.

In order for an adhesive agent or plastic to be injected between torsion bar 8 and the bore of input-shaft 2, both parts must be relatively clean and dry, otherwise bonding or keying of the parts will not adequately take place. The conventional method of determining the neutral position prior to fixing of input-shaft 2 to torsion bar 8 cannot be used as this would result in contamination of these respective parts with hydraulic oil. In accordance with the first aspect of the present invention, air is utilised as the pressure medium in order to determine the neutral position of input-shaft 2 with respect to sleeve 4. This leaves the parts clean and dry such that adhesive bonding, or other bonding means, can be used to connect them.

Figure 3:
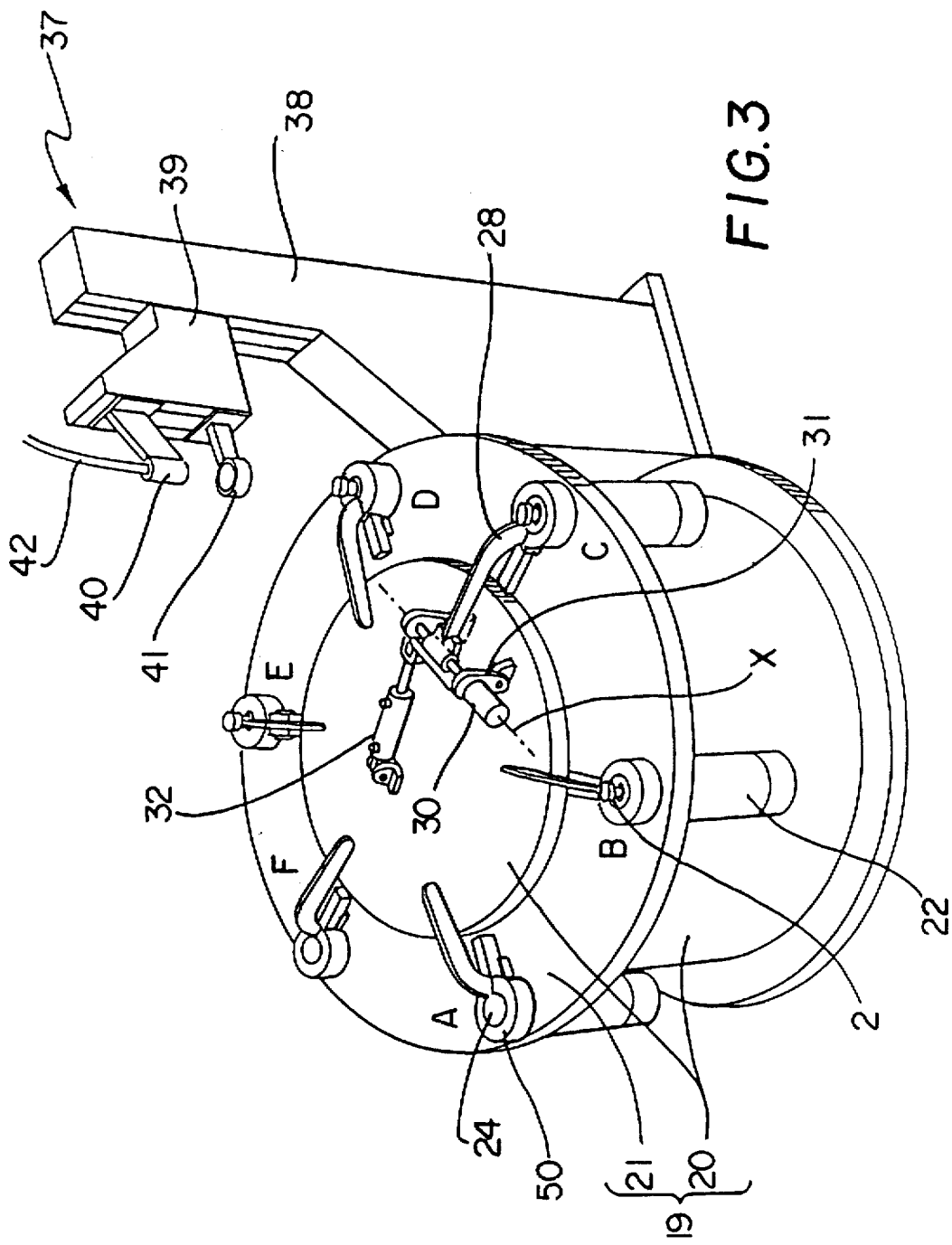
FIG. 3 is a perspective view of a balancing machine according to the first aspect of the present invention.

FIG. 3 depicts one embodiment of a balancing machine in accordance with the present invention. The balancing machine comprises rotary table 19 having circular inner base member 20 and an outer ring member 22 rotatably mounted thereto. Ring member 21 is adapted for incremental (indexed) rotation in a horizontal plane about base member 20, such that each balance housing 22 can be brought to one of six stations at which various operations take place. The stations will further be referred to as stations A through to F. The balancing machine is adapted to balance valves by passing them through stations A to F in a continuous process. However, for ease of description, the operation of the balancing machine will be described with respect to the progress of a single valve as it is followed through the various stations.

An unbalanced valve, comprising sleeve 4, input-shaft 2, torsion bar 8 and pinion 5 is loaded into the balancing machine at loading station A, the unbalanced valve not being shown in FIG. 3. The loading mechanism, also not shown, is a robot arm or some other automated mechanism well known in the art.

Figure 4:
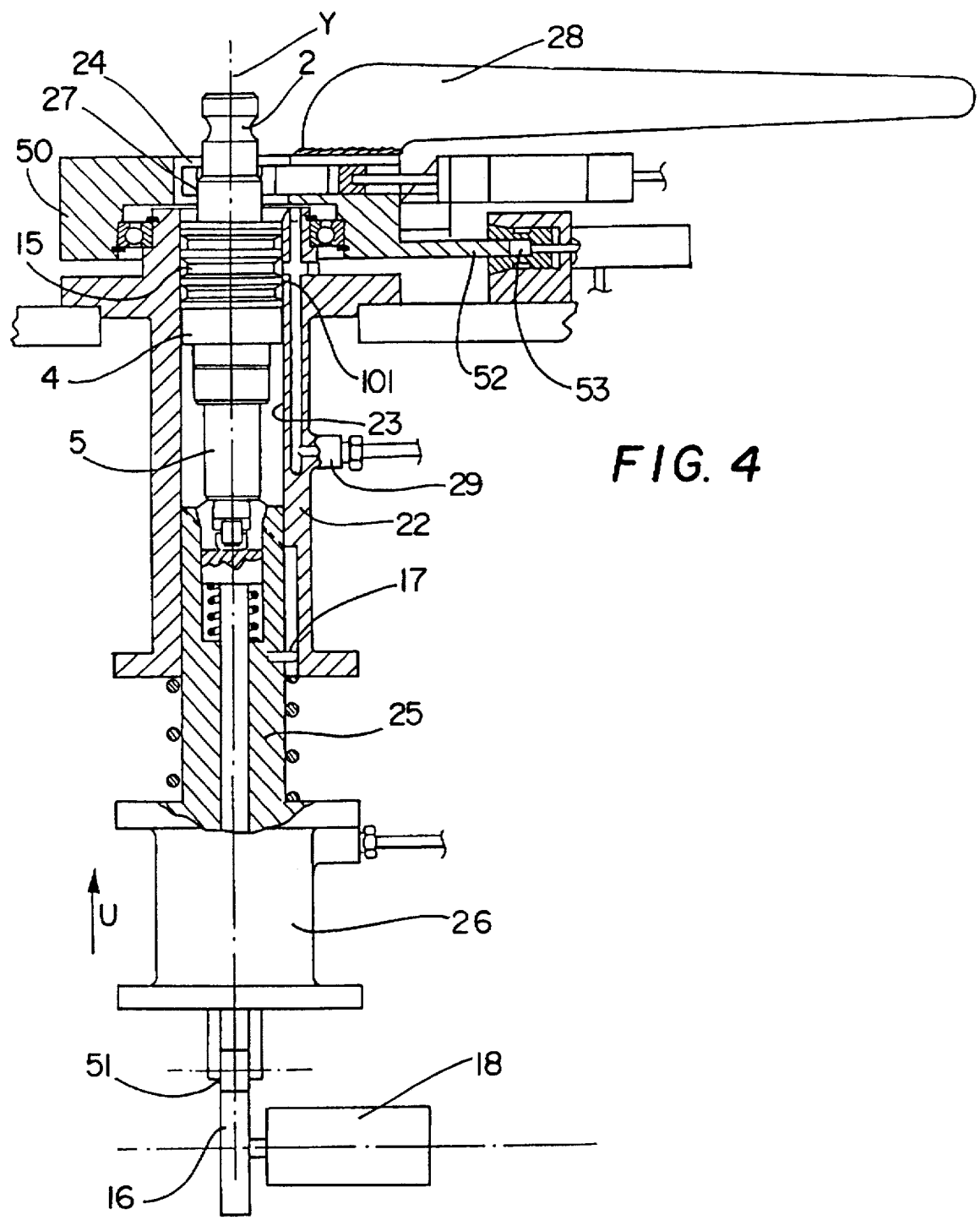
FIG. 4 is a cross-sectional elevational view of a balance housing which forms part of the balancing machine depicted in FIG. 3.
Figure 5:
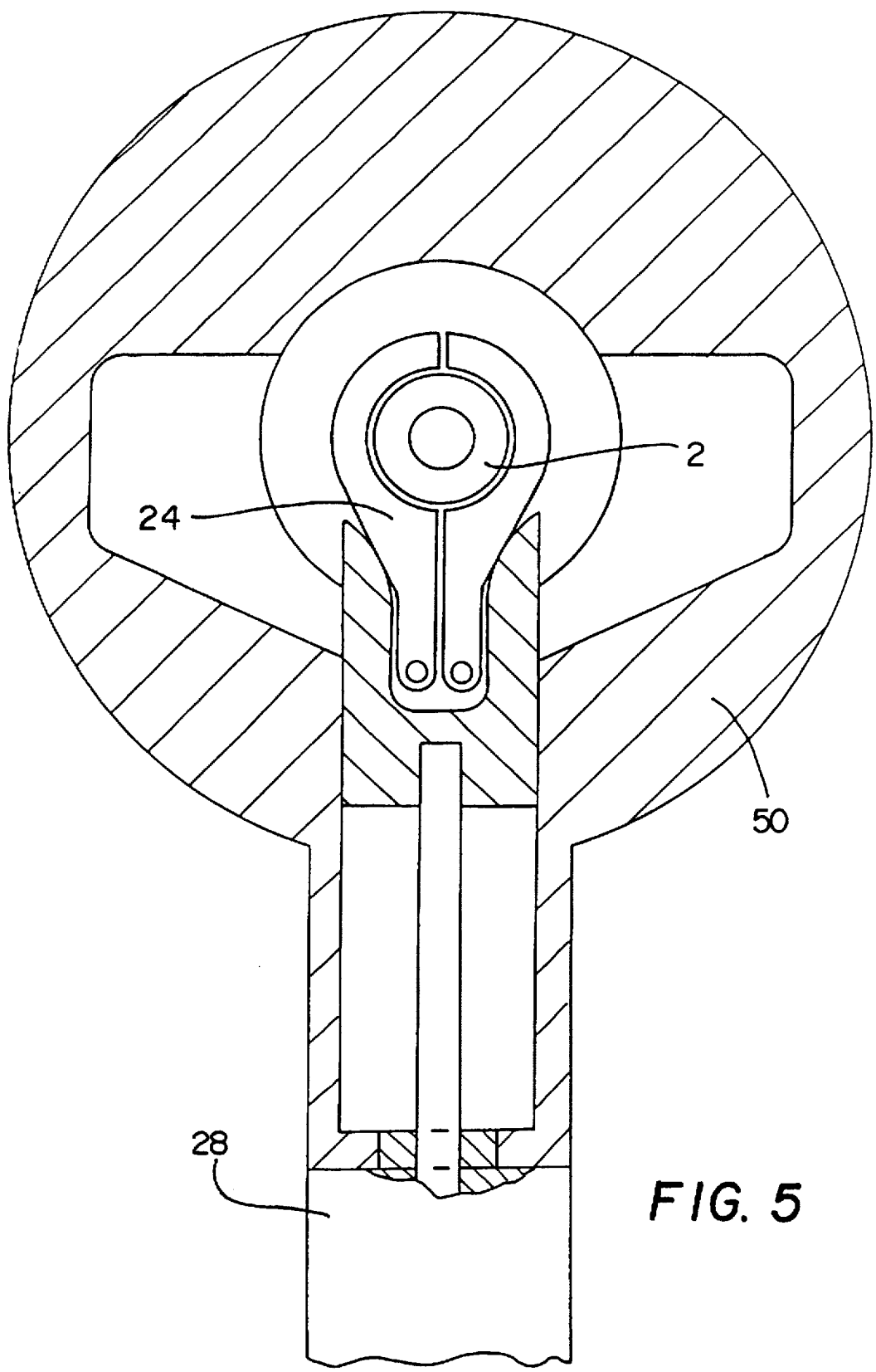
FIG. 5 is a is a plan sectional view of the balance housing depicted in FIG. 4.

FIG. 4 depicts an unbalanced valve loaded into balance housing 22 at loading station A. Balance housing 22 comprises bore 23 with upper collet 24 and lower collet 25 situated at opposite ends thereof. Lower collet 25 is axially movable within bore 23 by means of a cam mechanism which includes cam 16. Lower collet 25 is prevented from rotation in bore 23 via sliding key/keyway arrangement 27. Prior to loading of the unbalanced valve, lower collet 25 is open and ready to receive the unbalanced valve in an upward position, not shown in FIG. 4, due to the upward movement of lower collet 25 in direction U as driven by cam 16, cam follower 51 and servomotor 18. During loading, the unbalanced valve is inserted into bore 23 with pinion 5 as the leading end. Pinion 5 is clamped by lower collet 25 under the action of pneumatic cylinder 26, and the unbalanced valve is pulled into bore 23 in a direction opposite to direction U. Upper collet 24, integral with rotating upper collet carrier 50 and arm 28, then clamps input-shaft 2 at location 27 as shown in FIG. 5.

As shown in FIG. 4, arm 28 projects upwardly and radially from collet 24 and both are rotatable about axis Y as part of upper collet carrier 50. Balance housing 22 has an air inlet port 29 which allows for air to be supplied to circumferential inlet groove 15 of sleeve 4 which is now held rotatably stationary within bore 23. Sealing of inlet groove 15 is facilitated by standard sleeve circumferential seals 101 normally manufactured from glass or bronze filled Teflon. Alternatively, particularly if balancing is to be carried out in a low temperature operating environment where these standard sleeve seals 101 might not adequately conform (and hence seal) to bore 23, balancing may be conducted without the presence of seals 101 and a hydraulically or pneumatically actuated expanding bladder or other more sophisticated sealing arrangement could be employed.

Figure 13:
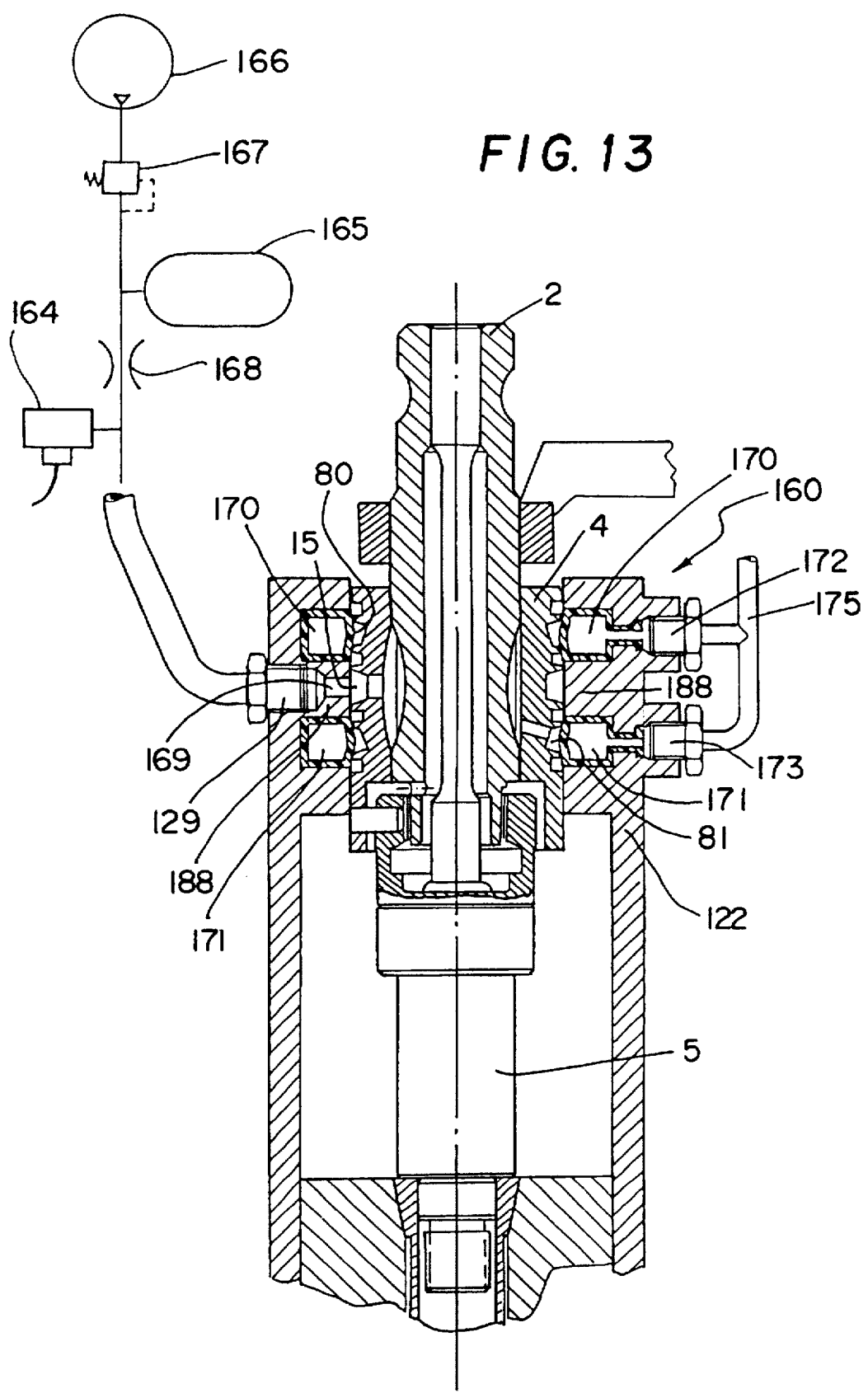
FIG. 13 is a cross-sectional elevational view of a balance housing in an alternative embodiment to that shown in FIG. 4, incorporating a bladder seal arrangement.
Figure 14:
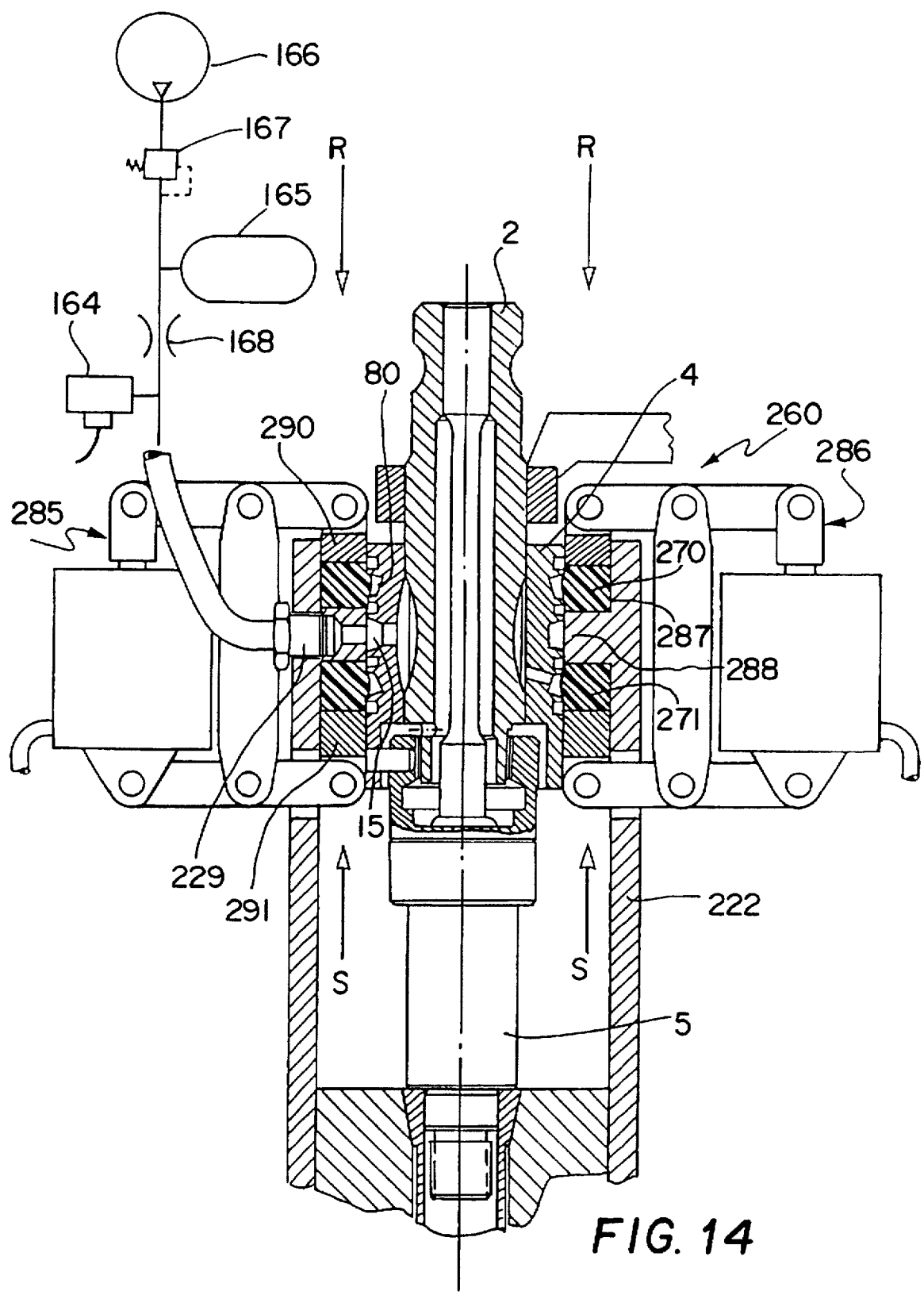
FIG. 14 is a cross-sectional elevational view of a balance housing in an alternative embodiment to that shown in FIG. 4, incorporating a seal ring arrangement.
Figure 15:
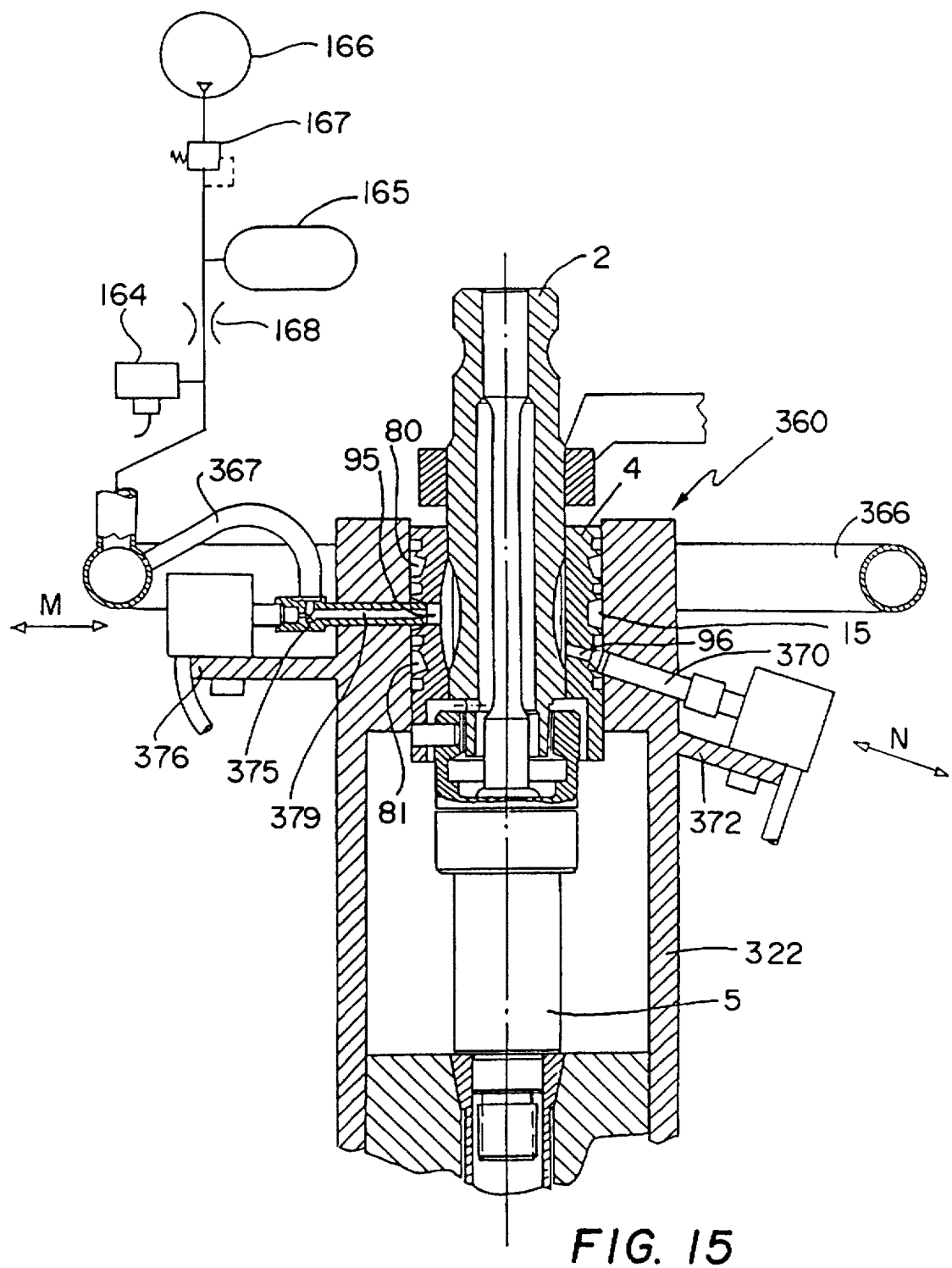
FIG. 15 is a cross-sectional elevational view of a balance housing in an alternative embodiment to that shown in FIG. 4, incorporating a probe seal arrangement.

FIGS. 13, 14 and 15 show various balance housing/sealing arrangements which allow the unbalanced valve to be balanced using air, without the presence of circumferential seals 101.

FIG. 13 depicts an embodiment in which a balance housing 122 incorporates temporary sealing means 160 which contacts and seals against the outside surface of sleeve 4 during balancing. Temporary sealing means 160 comprises first and second seal portions in the form of annular elastomeric expanding bladders 170 and 171 respectively, which contact sleeve 4 axially either side of inlet groove 15 in the region of adjacent cylinder grooves 80 and 81. Bladders 170 and 171 are each axially sufficiently wide to contact both sides of their respective cylinder grooves 80 and 81, thereby sealing off these cylinder grooves and hence the cylinder ports located in these cylinder grooves. Prior to balancing of the valve, bladders 170 and 171 are inwardly expanded by introduction of pressurised hydraulic fluid through hydraulic inlets 172 and 173 via tube 175 from a source (not shown). Bladders 170 and 171 are housed in balance housing 122 and are spaced apart by annular central portion 188 which therefore lies adjacent to inlet groove 15 of sleeve 4. The sealing of cylinder grooves 80 and 81 by bladders 170 and 171 restrains air to flow to inlet groove 15 during balancing, and hence through the inlet ports located in this inlet groove. Air is supplied for valve balancing from air receiver 165, filled by pump/ compressor 166 and regulated to a predetermined fixed pressure by regulator 167. Regulator 167 also incorporates an air filter and dryer according to normal engineering practice. Air drawn from air receiver 165 passes through fixed reference orifice 168 and thence to inlet 129 of valve balance housing 122. The pressure at inlet 129 is measured by pressure transducer 164. Radial bore 169 in central portion 188 communicates air to inlet groove 15 from inlet 129. After balancing, bladders 170 and 171 are depressurised thereby unloading these bladders from the outside surface of sleeve 4, and permitting valve removal.

It should be noted that bladders 170 and 171 could alternatively be expanded pneumatically, and depending on the exterior geometry of the sleeve, air to fill these bladders could be sourced from the same air receiver 168 from which air is drawn for the actual air balancing operation.

FIG. 14 depicts an embodiment in which a balance housing 222 incorporates temporary sealing means 260 which contacts and seals against the outside surface of sleeve 4 during balancing. Temporary sealing means 260 comprises first and second seal portions in the form of two seal rings 270 and 271 which contact sleeve 4 axially either side of inlet groove 15 in the region adjacent cylinder grooves 80 and 81. Seal rings 270 and 271 are preferably made of polyurethane or some other suitable elastomeric material and are located against inner wall 287 of balance housing 222. Seal rings 270 and 271 are sufficiently wide to contact both sides of their respective cylinder grooves 80 and 81, thereby sealing off these cylinder grooves and hence the cylinder ports located in these cylinder grooves. Compression rings 290 and 291 are located axially adjacent to seal rings 270 and 271 respectively, and are connected to two actuator mechanisms 285 and 286. Annular central portion 288 extends inwardly from wall 267 between seal rings 270 and 27t and lies adjacent to inlet groove 15 of sleeve 4. Prior to balancing of the valve, the actuator mechanisms 285 and 286, which are preferably hydraulically or pneumatically operated from a source not shown, are actuated and urge compression rings 290 and 291 axially in the direction of arrows R and S, respectively. As seal rings 270 and 271 are constrained by wall 287 and central portion 288, the movement of compression rings 290 and 291 causes the sealing surfaces of seal rings 270 and 271 to inwardly bulge and resiliently seal against the outside surface of sleeve 4. The sealing of cylinder grooves 80 and 81 by seal rings 270 and 271 restrains air to flow into inlet groove 15 during balancing and hence through the inlet pods located in this inlet groove. Air is supplied for valve balancing from air receiver 165 in a similar manner to the embodiment depicted in FIG. 13. After balancing, actuator mechanisms 285 and 286 are actuated in an opposite direction such that compression rings 290 and 291 no longer compress seal rings 270 and 271, thereby unsealing these seal rings from the outside surface of sleeve 4, and permitting valve removal.

FIG. 15 depicts a further embodiment in which balance housing 322 incorporates temporary sealing means 360 which contacts and seals against the outside surface of sleeve 4 during balancing. This embodiment differs from the sealing arrangements depicted in FIGS. 13 and 14, in that temporary sealing means 360 directly seals the ports located within inlet groove 15 and cylinder grooves 80 and 81 on the outside surface of sleeve 4, rather than circumferentially sealing the grooves per se. Temporary sealing means 360 has a plurality of inlet probes 375 and cylinder probes 370 (only one of each is shown in FIG. 15 for ease of reference). Inlet probe 375 is movably mounted on support member 376, such that it can be actuated, preferably hydraulically or pneumatically (not shown in detail), in directions shown by arrow M, inwardly and outwardly of balance housing 322. Likewise cylinder probe 370 is movably mounted on support member 372 and is able to be actuated in directions shown by arrow N, inwardly and outwardly of balance housing 322.

Prior to inserting the valve into balance housing 322, inlet probe 375 and cylinder probe 370 are in an outwardly retracted position to allow the valve to enter balance housing 322. Once the valve is inserted, inlet probe 375 and cylinder probe 370 are actuated to move inwardly and seal against inlet port 95 and cylinder port 96 respectively. Whilst for ease of reference only one inlet probe 375 and one cylinder probe 370 is shown in FIG. 5, a plurality of such probes would be required. For instance, in a typical eight slot rotary valve there would be four inlet ports 95 within inlet groove 15 and four cylinder ports 96 within each of the cylinder grooves 80 and 81. In a six slot rotary valve there would be three inlet ports 95 within inlet groove 15, and three cylinder ports 96 in each of the cylinder grooves. In operation, each of the inlet probes 375 and each of the cylinder probes 370 would be actuated simultaneously to move inwardly and seal their respective inlet ports and cylinder ports. Inlet probes 375 and cylinder probes 370 would preferably have tips made of elastomeric material to effectively seal against inlet ports 95 and cylinder ports 96, respectively. Once the probes are in a sealed position, as shown in FIG. 15, air balancing of the valve can be affected. Air is supplied to inlet port 95 through inlet bore 379 which is located within inlet probe 375 from air receiver 165 in a similar manner to the embodiment depicted in FIG. 3. As air must be supplied to all inlet probes 375 at substantially the same pressure, the air is delivered to all of the inlet probes 375 via an annular air distribution manifold 366. Each inlet probe 375 is fluidly connected to air distribution manifold 366 by a flexible tube 367.

Once the valve is balanced, inlet probes 375 and cylinder probes 370 are retracted, thereby unsealing inlet ports 95 and cylinder ports 96 and allowing for removal of the valve from balance housing 322.

Whilst any one of the previously described embodiments of balance housing could be utilised, the method of air balancing will be further described with reference to the embodiment of FIGS. 3 and 4 showing balance housing 22.

Once loading of the unbalanced valve has taken place at loading station A, ring member 21 of rotary table 19 is rotatably indexed such that balance housing 22 moves to checking station B. At this station, the unbalanced valve is checked for correct seating within bore 23 of balance housing 22 by sensing means, not shown, and arm 28 and upper collet 24 are oriented about axis Y such that they are in a correct position for the next operation at station C. Ring member 21 rotatably indexes so that balance housing 22 now moves to station C.

The operation performed at station C is the determination of the hydraulic neutral position of input-shaft 2 relative to sleeve 4. The first action that takes place at station C is the engagement of linear actuator 30 with arm 28. The filtered air supply which is connected to balance housing 22 is regulated to a predetermined fixed pressure and passed through a fixed reference orifice, not shown in FIG. 3 but similar to that detailed in the embodiment shown in FIG. 13, before entry into air inlet port 29.

Figure 6:
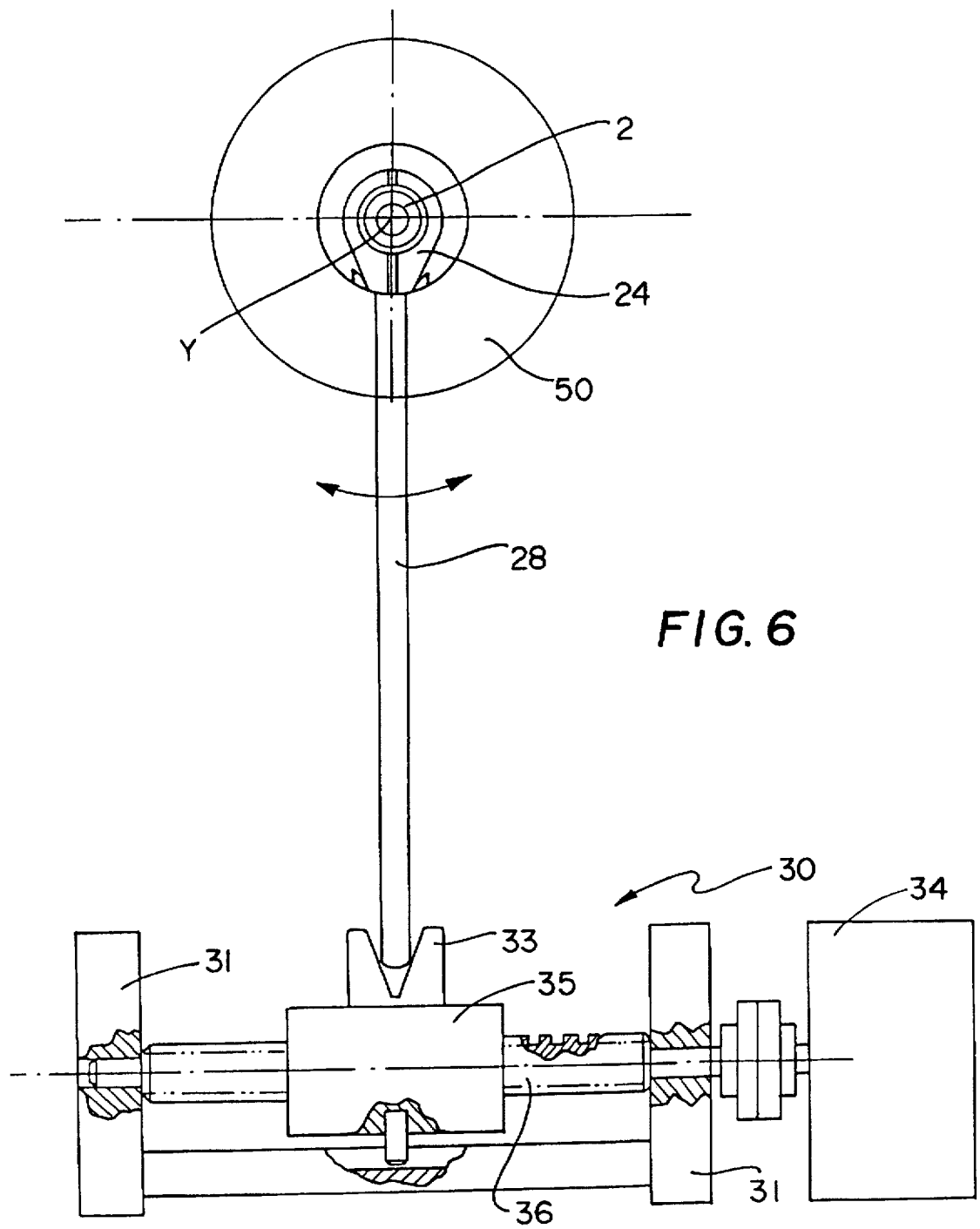
FIG. 6 is a is a plan view of the linear actuator mounted on the balancing machine depicted in FIG. 3 in an engaged position with the arm of the balance housing.

As shown in FIG. 3, linear actuator 30 is supported on base member 20 by two pivotal supports 31, which are pivotal about an axis X. Linear actuator 30 is rotatably urgable from an unengaged position, not shown, about axis X to an engaged position with arm 28 by extension of a pneumatic engagement actuator 32. As seen in FIG. 6 in the engaged position, the free end of arm 28 is movably constrained within a V-shaped gap 33 in block 35, the latter movably mounted on a rotatable threaded member 36 of linear actuator 30. Rotation of threaded member 36 by a servo motor 34, results in linear movement of block 35 which, when in the engaged position, rotates arm 28 and upper collet 24 about axis Y.

Once linear actuator 30 is in the engaged position with arm 28, the next step is to determine the neutral position of input-shaft 2 relative to sleeve 4. As linear movement of block 35 along threaded member 36 results in rotation of arm 28, and hence also upper collet 24 residing in upper collet carrier 50, an angular displacement of input-shaft 2 with respect to the sleeve 4 also occurs. Input-shaft 2 rotatably moves in clamped relationship with upper collet 24 whilst sleeve 4 is held stationary, as it is rigidly connected to pinion 5 being held by lower collet 25.

Linear actuator 30 is connected to a control means, not shown, which includes an encoder to measure angular displacement of input-shaft 2 relative to sleeve 4. The control means is also connected to a pressure transducer in the air supply, not shown in FIG. 3 but similar to that detailed in the embodiment shown in FIG. 13, such that it can measure air pressure at air inlet 29. Angular displacement of input-shaft 2 with respect to sleeve 4, as a result of arm 28 being rotated by linear actuator 30, results in the measured air pressure varying. The neutral position is determined by displacing input-shaft 2 in one direction until the measured air pressure corresponds to a predetermined check pressure and the magnitude of the angular displacement of input shaft 2 is recorded. Input-shaft 2 is then rotated in the opposite direction until the measured pressure again equals the predetermined check pressure, and the magnitude of angular displacement of input-shaft 2 in this opposite direction, is similarly recorded. The mean, or halfway point, of these two angular displacement is then calculated and input-shaft 2 is rotated to this mean position, which is the neutral position. Upper collet 24 is then rotatably held by the clamping action of pneumatic brake calliper 53 on disk portion 52 of upper collet carrier 50, in order to maintain the neutral position prior to balance housing 22 being indexed to bonding station D.

The previously described cam mechanism, which includes cam 16, also acts as an oscillating mechanism. This oscillating mechanism is operated subsequent to the determination of the neutral position and prior to balance housing 22 being indexed to station D. Cam 16 imparts pure axial reciprocating movement along axis Y to lower collet 25, and hence to all valve components excluding input-shaft 2. This reciprocating axial movement substantially overcomes residual frictional torque existing between the fixing end of the torsion bar 8 and input-shaft 2 and hence ensures that torsion bar 8 is in its undeflected state prior to fixing it to input-shaft 2.

As shown in FIG. 3, a bond applicating machine 37 is positioned at bonding station D. This station serves to bond the fixing end of torsion bar 8 in its undeflected state to input-shaft 2. Fixing is by means of applying an adhesive bond, whilst input-shaft 2 is held in the neutral position relative to sleeve 4. Bond applicating machine 37 comprises upright support member 38 which carries a vertically slideable carriage 39 thereon. A dispensing nozzle 40 and low frequency induction heating coil 41 are coaxially mounted on carriage 39. Nozzle 40 is vertically slideable with respect to carriage 39, with heating coil 41 fixed to carriage 39 below nozzle 40. A supply line 42 delivers adhesive from an adhesive supply, not shown, to nozzle 40.

Figure 7:
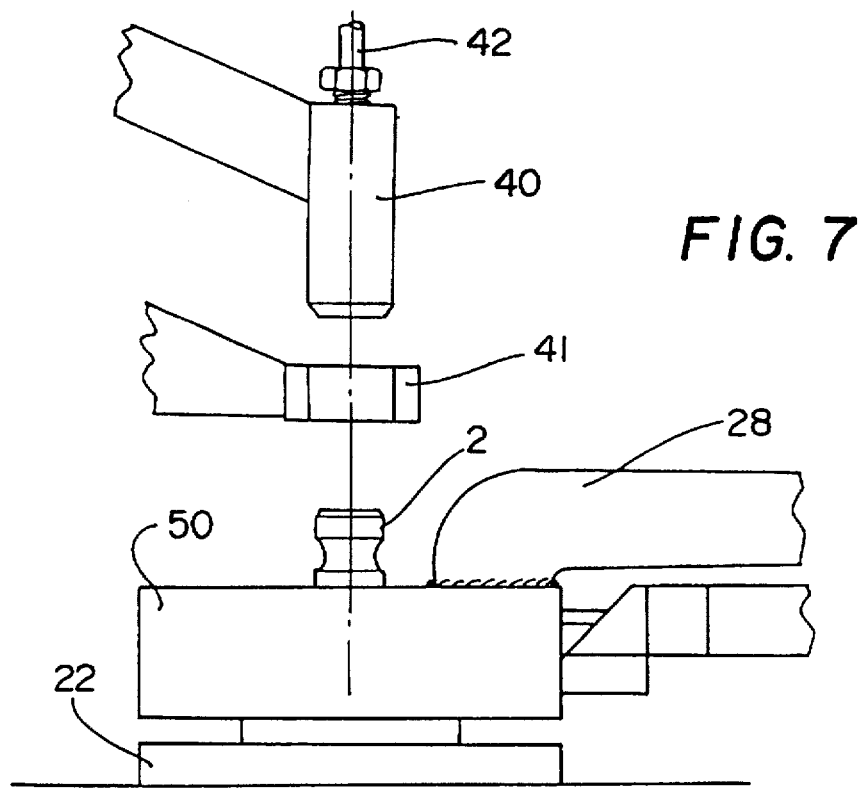
FIG. 7 is a partial elevational view of the dispensing nozzle and heating coil detail of the bond applicating machine portion of the balancing machine in FIG. 3.
Figure 8:
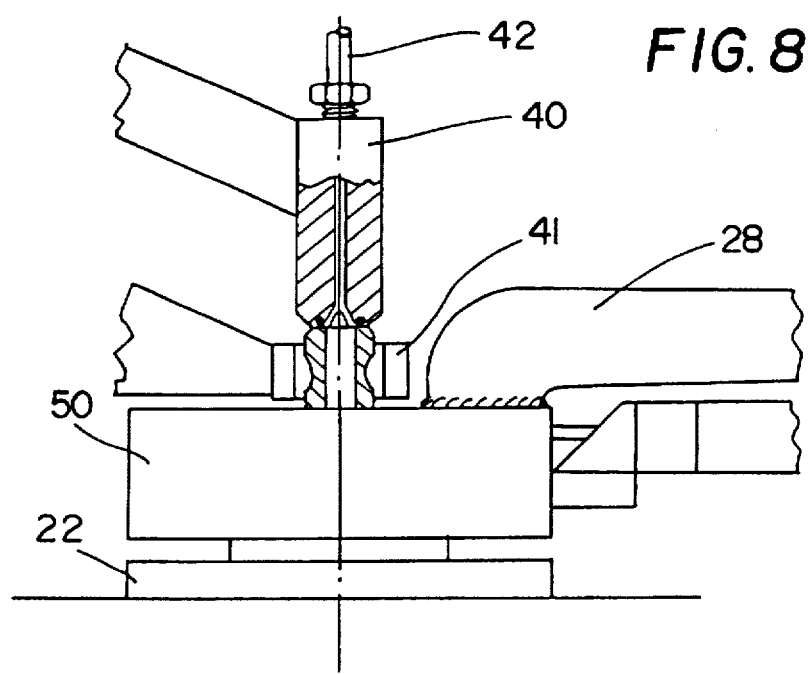
FIG. 8 is a partial cross-sectional view of the dispensing nozzle and heating coil detail of FIG. 7 when the adhesive is being applied.

When balance housing 22 is brought to bonding station D, input-shaft 2 and torsion bar 8 are in coaxial alignment with nozzle 40 and heating coil 41 (see FIG. 7). In order for the adhesive to be applied, carriage 39 is moved downwardly such that heating coil 41 surrounds input-shaft 2 near its free end, and nozzle 40 is brought down in sealing abutment therewith, such that the opening of nozzle 40 surrounds the cylindrical interface of input-shaft 2 and torsion bar 8 at the free end (see FIG. 8). Adhesive is then injected such that it spreads inwardly between and around the cylindrical interface between input-shaft 2 and torsion bar 8, in bonding region 13. Nozzle 40 is then upwardly retracted and heating coil 41 is activated for a short time, such that it heats the upper end of input-shaft 2, the fixing end of torsion bar 8 and the adhesive in this vicinity. Heating assists curing of the adhesive bond. Coil 41 is then also retracted upwardly. Balance housing 22 can now be indexed to curing station E.

At curing station E the balance housing is not worked upon, and its sole purpose is to allow further curing of the adhesive bond assisted by retained heat in the various components. Balance housing 22 is then indexed to unloading station F at which upper collet 24 releases and lower collet 25 raises and then releases the balanced valve, which is then removed from the balancing machine by the robot arm or automated mechanism (not shown).

Once removed from the balancing machine, the balanced valve may be placed aside for further curing of the adhesive bond.

Figure 9:
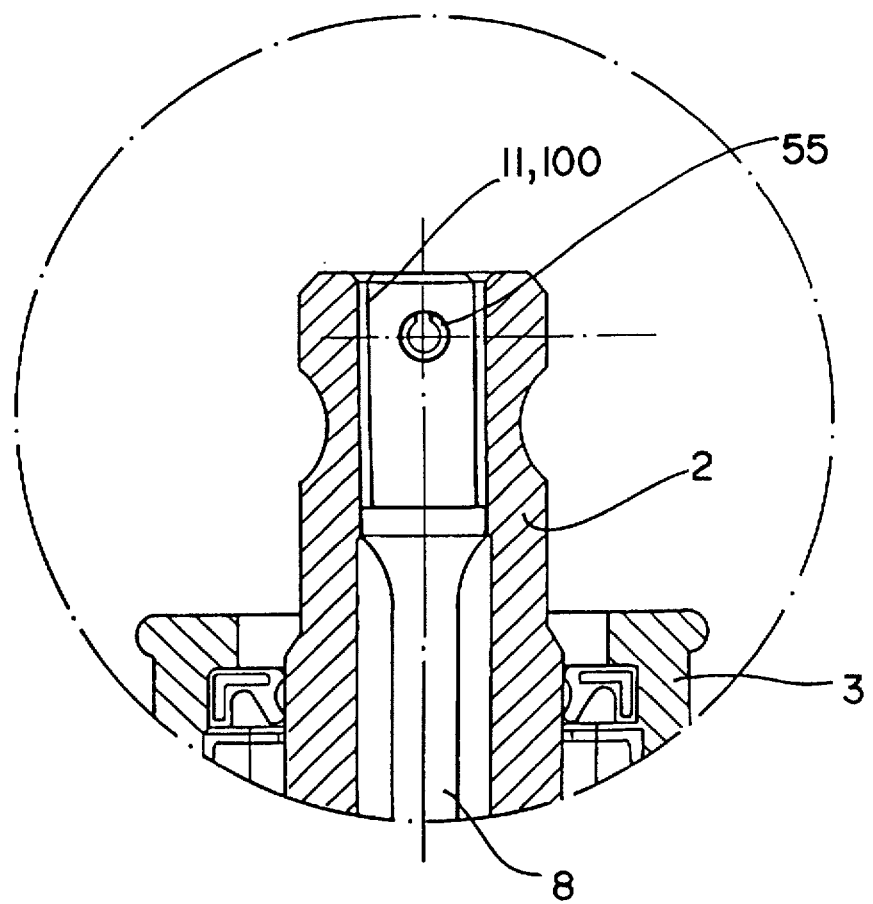
FIG. 9 is a partial sectional view Of a preferred embodiment of a valve assembly similar to FIG. 2 with addition of a roll pin press fitted through a hole diametrally disposed through the input-shaft and torsion bar.

When bonding has reached sufficient strength, balanced valve 1 is taken to a separate work station where a substantially diametrally disposed hole is machined through input-shaft 2 and the fixing end of torsion bar 8, preferably at or near where they are bonded together. Pin 55 as shown in FIG. 9 can then be press fitted therein. Pin 55 is a roll-pin and need not have the same degree of interference fit as required in the case of prior art pin 9. Principally, pin 15 is a safety device and may only be functional in the rare circumstance where the bond may fail during service of the valve.

In further embodiments not shown, the method of the present invention may vary in the steps performed and the apparatus to perform this method, resulting in the balancing machine having a different configuration.

For instance, in not shown embodiments, the adhesive bond between input-shaft 2 and the fixing end of torsion bar 8 may be replaced by a soldered, brazed or welded joint (such as that achieved by "electron beam" welding).

In an embodiment as earlier described with reference to FIG. 12, where the adhesive bond between input-shaft 2 and the fixing end of torsion bar 8 is replaced by a mechanical keying agent such as plastic, the bonding station D in the earlier described embodiment of the balancing machine would be replaced by a plastic injection reducing station. Such a moulding station, may in one embodiment incorporate an injection nozzle 97, as shown in FIG. 16, which is adapted to fit over the free end of input-shaft 2. Nozzle 97 having a bore 98 through which the plastic is delivered to the cavity between input-shaft 2 and the fixing end of torsion bar 8. The plastic is supplied to the nozzle 97 by a typical screw feeder 99, shown schematically.

In other, not shown, embodiments the balancing machine previously described may differ in the number of work stations and the operations performed. For instance, in one variation, the loading station A and unloading station F of the described embodiment could be combined into a single station, where loading of an unbalanced valve into balance housing 22 occurs after balanced valve is removed.

In another not shown embodiment the curing station E may not be required depending on the cycle time of the various operations and the curing time for the adhesive bond.

Alternatively, at the expense of a longer cycle time for the process, stations A to F (or subsets thereof) could be combined as a single, multifunctional station.

In further not shown embodiments the balance housing/sealing arrangements may incorporate seal arrangements which differ in shape and configuration to those shown in FIGS. 13, 14 and 15, it should also be understood that a combination of the various seal elements such as bladders, ring seals and probes could be utilised in a not shown single embodiment of a balance housing/sealing arrangement.

It will also be appreciated by those skilled in the art that the balancing method disclosed in this specification could be equally applied to "reverse" balancing machine formats, where the input-shaft is rotationally held fixed and the driven member (and hence also the sleeve) rotated during determination of the neutral position. In such a balancing machine the balance housing, and associated temporary sealing means, would be preferably allowed to rotationally float so that sealing on the outside surface of the sleeve is not interrupted as the driven member is rotated. Also, in this configuration of balancing machine, the aforementioned axial reciprocating movement applied to all valve components excluding the input-shaft could be accommodated if the balance housing is additionally able to axially float, again in order that sealing on the outside surface of the sleeve is not interrupted. Alternatively, the axial reciprocating movement could be applied to the input-shaft and a keying arrangement employed to ensure that no rotational motion of this component occurs.

It should also be understood that balancing a valve by means of a gaseous pressure medium such as air, may also be achieved by passing the air through the valve in a reverse direction to that shown in the embodiments. This would result in air exiting from the valve through ports in the sleeve.

It should be obvious to persons skilled in the art that numerous variations and modifications could be made to the method and apparatus of the present invention as described and with reference to the drawings without departing from the overall spirit and scope of the invention.

We claim:

1. A method of balancing an hydraulic valve for a power steering gear in which the valve is subjected to a pressure medium, the valve comprising a sleeve journalled on an input-shaft, the sleeve having a torsion bar connected thereto via a driven member, the method comprising the steps of:

inserting the valve into a balance housing;

determining the neutral position of the input-shaft relative to the sleeve; and fixing the neutral position by rotational connection of the input-shaft and torsion bar, characterised in that the pressure medium used to determine the neutral position is a gaseous medium and a temporary sealing means adapted to seal the gaseous medium is in contact with the outside surface of the sleeve during determination of the neutral position.

2. A method as claimed in claim 1, wherein the temporary sealing means is arranged to permit flow of the gaseous medium through at least one inlet port within the sleeve and inhibit flow of the gaseous medium through at least one cylinder port within the sleeve.

3. A method as claimed in claim 2, wherein the temporary sealing means comprises first and second seal portions contacting the sleeve at a position axially on each side of an inlet groove in which the at least one inlet port is located.

4. A method as claimed in claim 3, wherein the at least one cylinder port is located in a cylinder groove axially adjacent to the inlet groove, one of the seal portions contacting both sides of the cylinder groove, thereby sealing off the cylinder groove and inhibiting flow of the gaseous medium through the at least one cylinder port.

5. A method as claimed in claim 3, wherein the balance housing comprises an annular central portion located between the first and second seal portions of the temporary sealing means and arranged to lie adjacent to the inlet groove.

6. A method as claimed in claim 5, wherein the gaseous medium is fluidly delivered to the inlet groove and hence admitted to the at least one inlet port located in the inlet groove, through a bore in the central portion.

7. A method as claimed in claim 5, wherein the gaseous medium is fluidly delivered to a bore in the annular central portion of the balance housing via the at least one inlet port located in the inlet groove.

8. A method as claimed in claim 3, wherein at least one of the first and second seal portions is an expandable bladder.

9. A method as claimed in claim 8, wherein the bladder is an inwardly expandable annular bladder.

10. A method as claimed in claim 9, wherein the bladder is hydraulically or pneumatically pressurised during valve balancing, thereby inwardly expanding to contact and seal against the outside surface of the sleeve.

11. A method as claimed in claim 3, wherein at least one of the first and second seal portions comprises a seal ring, urging means arranged to elastically deform the seal ring such that its inside circumferential surface contacts and seals against the outside surface of the sleeve.

12. A method as claimed in claim 11, wherein the urging means is mechanical, hydraulic, pneumatic or a combination thereof and arranged to load the outside circumferential surface of the seal ring radially inwards.

13. A method as claimed in claim 11, wherein the urging means is mechanical, hydraulic, pneumatic or a combination thereof, and arranged to compress the ring seal axially, the seal ring constrained on its outside circumferential surface by a bore portion of the balancing housing, axial compression of the seal ring thereby resulting in a reduction of diameter of its inside circumferential surface.

14. A method as claimed in claim 2, wherein the temporary sealing means comprises at least one cylinder probe arranged to load radially inwardly against the at least one cylinder port during balancing and therefore seal the at least one cylinder port.

15. A method as claimed in claim 2, wherein the temporary sealing means comprises at least one inlet probe arranged to load radially inwardly against the at least one inlet port during balancing, permitting flow of the gaseous medium through the at least one inlet port.

16. A method as claimed in claim 1, wherein the balance housing is ported to allow the pressure medium to flow through the valve and is adapted to hold the input-shaft and torsion bar such that they are rotatable with respect to each other.

17. A method as claimed in claim 1, wherein the temporary sealing means is not a component of the hydraulic valve.

18. A method as claimed in claim 1, wherein the hydraulic valve comprises circumferential seals solely for sealing of hydraulic fluid during operation of the valve and said circumferential seals are not fitted to the valve during balancing.

19. A method as claimed in claim 1, wherein the temporary sealing means is incorporated in the balance housing.

20. A method as claimed in claim 1, wherein the neutral position is determined by measuring the pressure generated in the gaseous medium for small angular rotational displacements of the input-shaft with respect to the sleeve or measuring the pressure generated in the gaseous medium for input torques applied to the input-shaft with respect to the driven member.

21. A method as claimed in claim 1, wherein the input-shaft is connected to the torsion bar by means of a bonding process.

22. A method as claimed in claim 21, wherein the bonding process comprises adhesive bonding, soldering, brazing or welding.

23. A method as claimed in claim 21, wherein the bonding process comprises injection of a bonding agent or mechanical keying agent between the input-shaft and the torsion bar.

24. A method as claimed in claim 23, wherein the bonding process comprises heating of the input-shaft and torsion bar in the region where the bonding agent or mechanical keying agent has been injected.

25. A method as claimed in claim 24, wherein the bonding process comprises heating of the input-shaft and torsion bar in the region where the bonding agent has been injected to accelerate curing of the bonding agent.

26. A method as claimed in claim 24, wherein tho heating of the input-shaft and torsion bar is induction heating.

27. A method as claimed in claim 23, wherein the mechanical keying agent is a plastic.

28. A method as claimed in claim 21 wherein the valve is removed from the balance housing once bonding between the input-shaft and the torsion bar has reached sufficient strength to resist forces generated by such removal.

29. A method as claimed in claim 21, wherein a substantially diametrically disposed hole is drilled through the input-shaft and torsion balance the bonding between the input-shaft and torsion bar has reached sufficient strength to resist forces generated by such drilling and a pin is press fitted within the hole.

30. A method as claimed in claim 29, wherein the pin is a roll-pin.

31. A method as claimed in claim 1, wherein the gaseous medium being supplied during balancing is regulated to a predetermined fixed pressure, then passed through a fixed reference orifice before entering an inlet to the balance housing.

32. A method as claimed in claim 31, wherein the pressure of the gaseous pressure medium is measured at the inlet to the balance housing and compared to a check pressure for determining the neutral position.

33. A method as claimed in claim 1, wherein the gaseous medium is air.

34. A method as claimed in claim 33, wherein the air is supplied from a filtered compressed air supply.

35. A method as claimed in claim 1, wherein the power steering gear is of the rack and pinion type and the driven member is a pinion.

36. A method as claimed in claim 1, wherein the power steering gear is of the integral type and the driven member is a worm portion of a recirculating ball nut.

37. A method as claimed in claim 1, wherein the valve is a rotary valve.

38. A method as claimed in claim 1, wherein the input-shaft and torsion bar are axially displaced with respect to each other prior to fixing the input-shaft to the torsion bar.

39. A method as claimed in claim 23, wherein a radial clearance exists between the input-shaft and torsion bar and the injected bonding agent or mechanical keying agent substantially fills the resulting annular cavity to provide a seal preventing hydraulic fluid from leaking from the valve in use.

40. A method as claimed in claim 1, wherein during balancing the gaseous medium is admitted to the valve or extracted from the valve through ports in the sleeve.

* * * * *